United States Patent [19]
Ruehl et al.

[11] Patent Number: 4,554,609
[45] Date of Patent: Nov. 19, 1985

[54] TRANSIENT VOLTAGE PROTECTOR

[75] Inventors: William E. Ruehl, Wheeling; Richard H. Heidorn, Lombard; Edwin G. Swick, Bartlett, all of Ill.

[73] Assignee: Illinois Tool Works Inc., Chicago, Ill.

[21] Appl. No.: 568,178

[22] Filed: Jan. 5, 1984

[51] Int. Cl.⁴ .............................................. H02H 1/04
[52] U.S. Cl. .................................... 361/119; 361/131
[58] Field of Search ............... 361/117, 119, 131, 392; 339/193 VS

[56] References Cited

U.S. PATENT DOCUMENTS 4,345,294  8/1985  Forberg et al. ..................... 361/119

Primary Examiner—Harry E. Moose, Jr.
Attorney, Agent, or Firm—John P. O'Brien; Thomas W. Buckman

[57] ABSTRACT

A transient voltage protector is provided for telephone lines and the like. An insulating plastic housing is provided with two pairs of terminals having female connections at the lower ends for association with selected terminals of a telephone terminal block. The upper ends of these terminals are of a male type and extend above the top of the housing for receipt of further elements such as bridging clips, plug-on fuse units, or line status indicators. An offset and raised portion of the housing carries a pair of zener diodes having lower wire terminals connected to two of the aforesaid terminals. The upper wire terminals of the zener diodes are connected to a grounding terminal having an upper portion extending above the housing in the form of two spaced tines for receipt of a common ground wire between the tines. The various terminals and the zener diodes and the housing have complementary structure for positioning of the terminals and the diodes within the housing.

10 Claims, 21 Drawing Figures

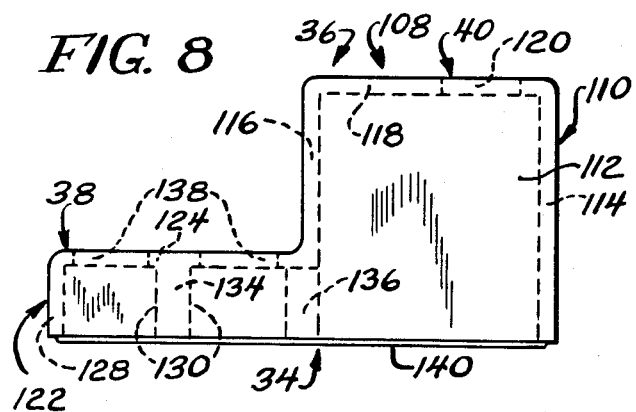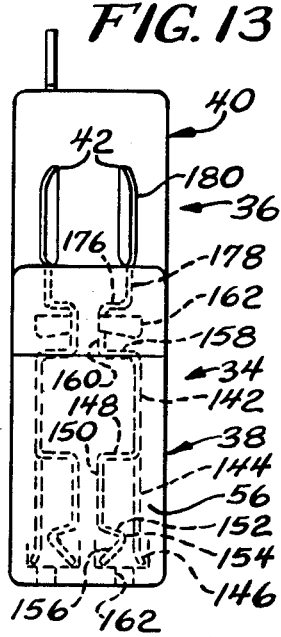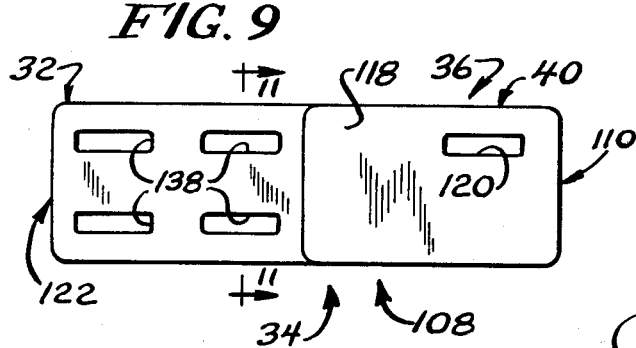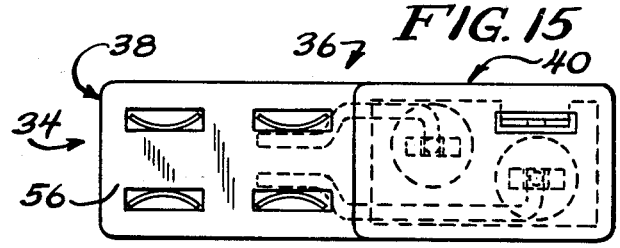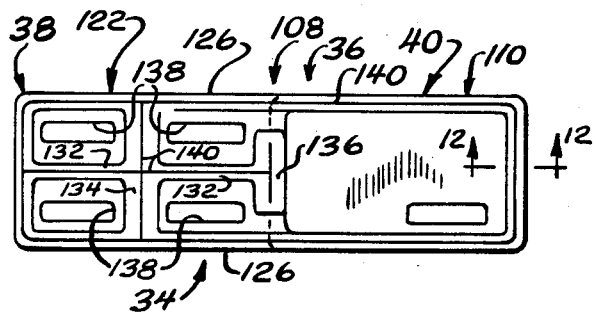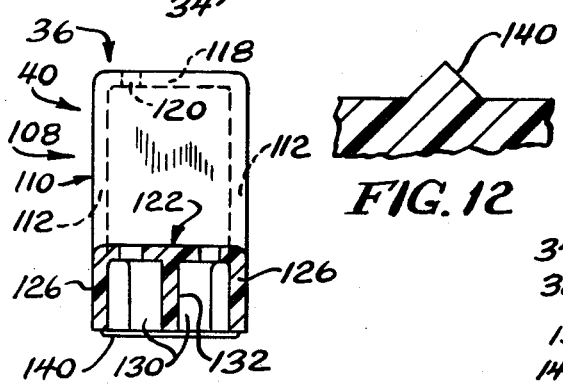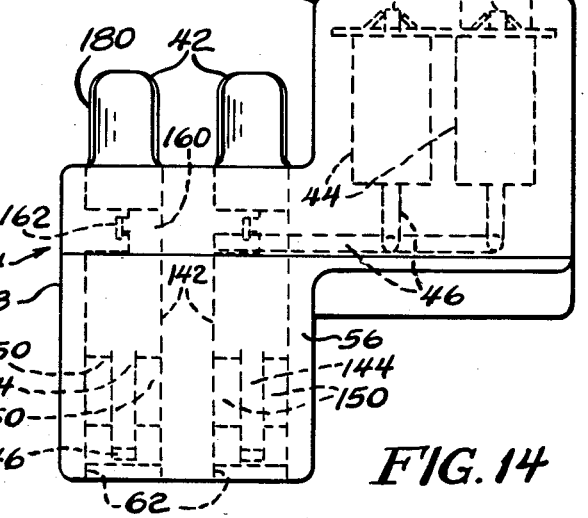

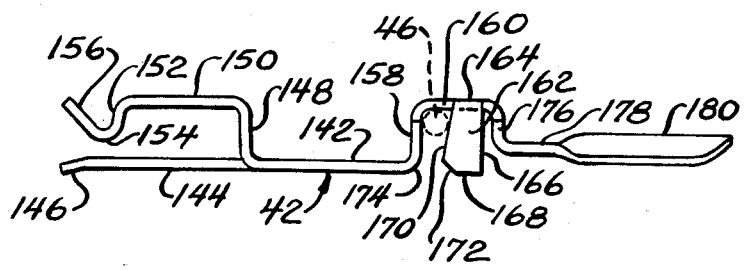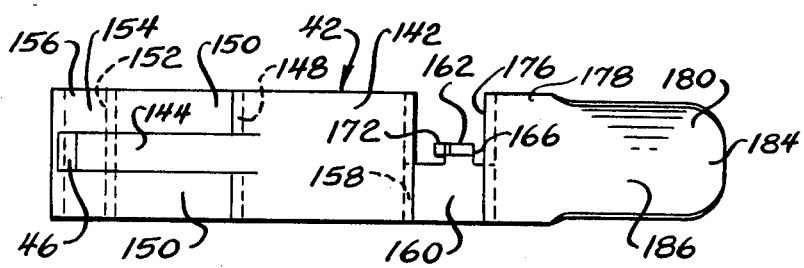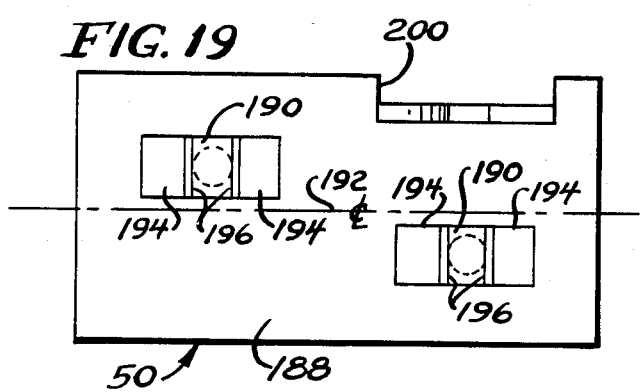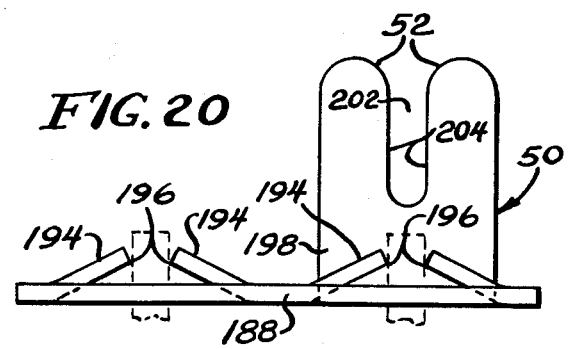

TRANSIENT VOLTAGE PROTECTOR

BACKGROUND OF THE INVENTION

Telephone circuits operate on relatively low voltages. Such circuits are sometimes exposed to transient voltages of considerably higher levels than the normal operating voltages. This may be effected by a lightning strike, by momentary contact with a high voltage line, or by other causes. Therefore, it is desirable to provide means for protecting low voltage telephone circuits against such high transient voltages.

It is known to provide plug-in structures for use with telephone terminal blocks to provide connection thereto, including electrical components for protecting against high transient voltages, see for example U.S. Pat. Nos. 4,113,340, 4,116,524 and 4,126,369.

OBJECTS AND SUMMARY OF THE PRESENT INVENTION

It is generally the object of the present invention to provide a new and improved transient voltage protector.

More particularly, it is an object of the present invention to provide a transient voltage protector having a two-piece interfitting housing providing structure for receiving four contact terminals, a grounding terminal, and a pair of limiting devices.

In attaining the foregoing and other objects of the present invention there is provided a two-piece housing which telescopes in part. Cavities are provided in the main or male portion of the housing for receiving four identical metal terminals positioned so as to engage two vertically adjacent and two horizontally adjacent terminals of a split 66-M terminal block in common use in telephone and other electronic applications. Aligned cavities are provided in the secondary or female portion of the housing for receiving portions of the aforesaid metal terminals with the ends thereof extending outwardly from the housing for connection to other devices, such as bridging clips, plug-on fuse units or line status indicators. A raised side portion of the male housing portion is provided with partially cylindrical cavities for receipt of upstanding zener type diodes having wire contacts received in two of the four metal terminals, and having their other wire contacts received in a grounding terminal. A box-like portion of the female housing part telescopes with the partially cylindrical sections housing the zener diodes. This telescoping of the parts of the housing brings about a rather effective assembly of the parts which is subsequently augmented by sonic welding of two housing parts into a single unit.

THE DRAWINGS

The present invention will best be understood from the following description when taken in connection with the accompanying drawings wherein:

FIG. 8 is a front view of the female or cap housing portion;

FIG. 9 is a top view thereof;

FIG. 10 is a bottom view thereof;

FIG. 11 is a view partially in section taken along the line 11—11 in FIG. 9;

FIG. 12 is a detail sectional view of the energy director as taken along the line 12—12 in FIG. 10, f.i.;

FIG. 13 is an end view of the transient voltage protector of the present invention;

FIG. 14 is a front view thereof;

FIG. 15 is a top view thereof;

FIG. 16 is a side view of one of the blade terminals forming a part of the present invention;

FIG. 17 is a front view thereof;

FIG. 18 is an end view thereof;

FIG. 19 is a top view of the grounding terminal forming a part of the present invention;

FIG. 20 is a front view thereof; and

FIG. 21 is an end view thereof.

DETAILED DISCLOSURE OF THE ILLUSTRATED EMBODIMENT

Figure 1:
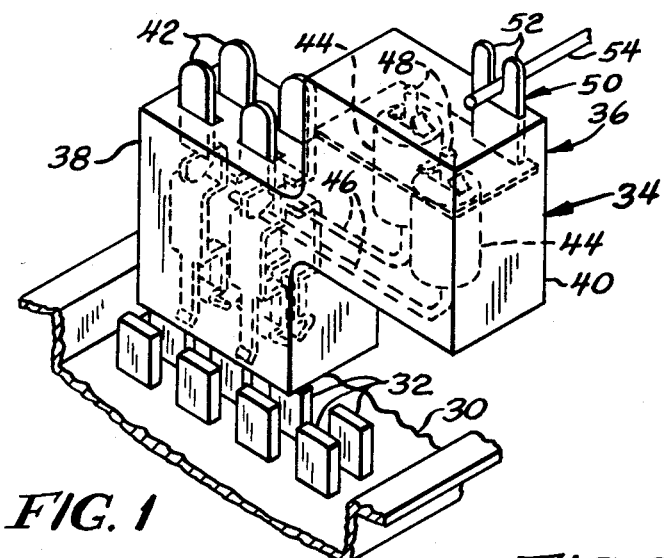
FIG. 1 is a perspective view of a transient voltage protector constructed in accordance with the present invention.
Figure 5:
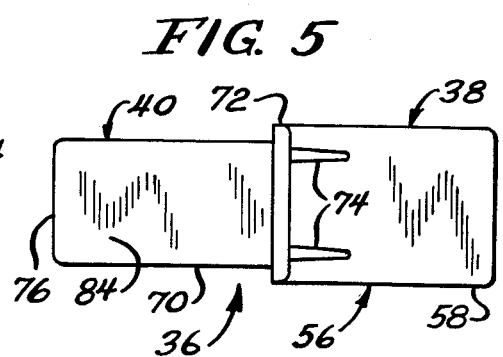
FIG. 5 is an end view thereof.
Figure 2:
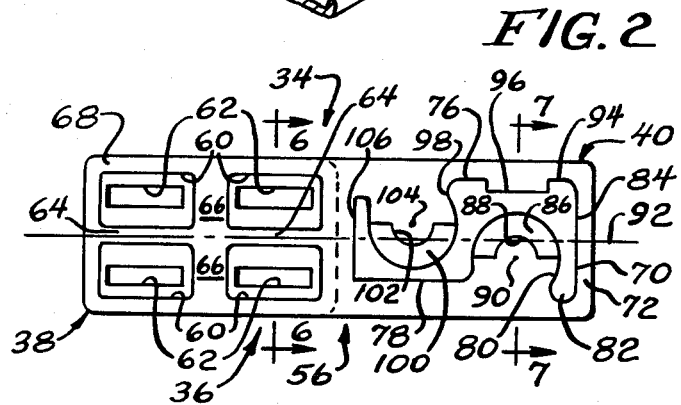
FIG. 2 is a top view of the male housing portion.
Figure 6:
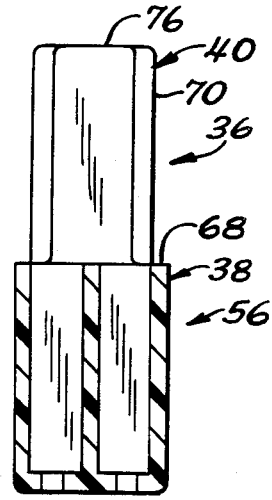
FIG. 6 is a view partially in section taken along the line 6—6 in FIG. 2.
Figure 3:
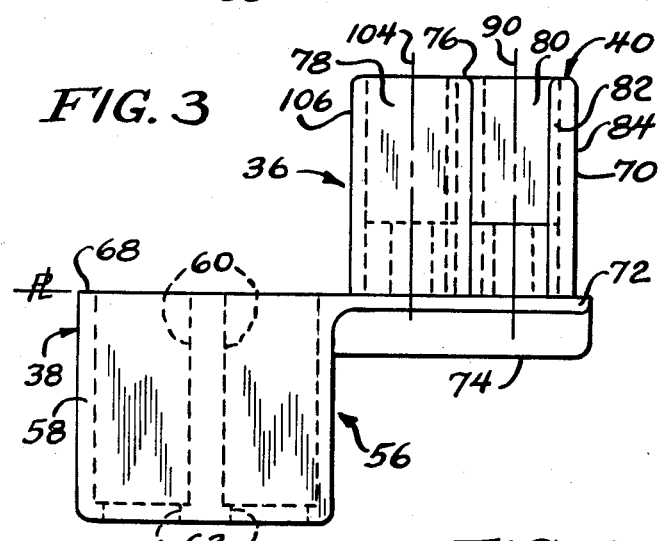
FIG. 3 is a front view thereof.
Figure 4:
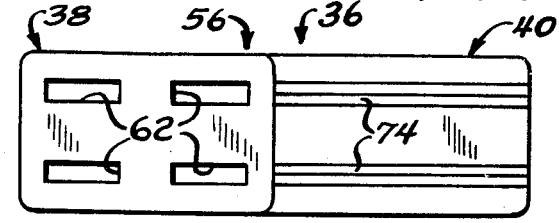
FIG. 4 is a top view thereof.
Figure 7:
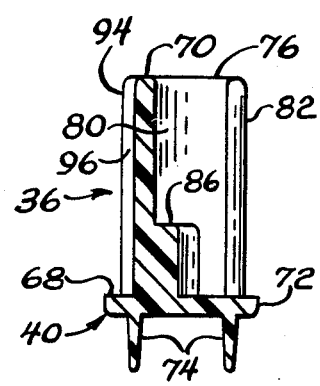
FIG. 7 is a view partially in section taken along the line 7—7 in FIG. 2.

The general arrangement of the present invention may be seen with reference to FIG. 1 wherein there is seen a simplified version of a 66-M terminal block 30 having four pairs of upstanding blade terminals 32 thereon. The transient voltage protector of the present invention is identified generally by the numeral 34 and is intended for physical and electrical association with four of the contacts 32, for example, the four central contacts. The transient voltage protector 34 includes a plastic housing 36 of suitable material such as clear Lexan and is made of two parts which partially telescope and which are sonically welded together as will be apparent hereinafter. The housing includes a terminal portion 38 and a grounding portion 40. The terminal portion 38 houses four sheet metal terminals 42 of novel and identical construction. The grounding portion 40 houses a pair of zener diodes 44, for example those sold by General Semiconductor as TRANSZORB 1.5 KE27C. A lower lead 46 of each zener diode is formed to fit around and through housing portions and into association with the two adjacent terminals 42 in a manner hereinafter to be described. The upstanding zener diode terminals 48 are trimmed short and interfit with a top or grounding contact 50 having a spaced pair of tines 52 upstanding through the top of the housing grounding portion 40 and adapted to receive snugly between them a common ground wire 54.

The housing 36 is further shown in FIGS. 2-15, and in particular there is shown a base or male portion 56 in FIGS. 2-7, and also in FIGS. 13-15. The base or male portion 56 includes a depending portion which is rectangular in front elevation, in side elevation, and from the top. This depending portion 58 is provided with four vertical cavities 60 respectively for receipt of the terminals 42. Slots 62 of reduced dimension communicate with the bottom ends of the cavities 60 through the bottom of the depending base portion 58 for receipt of the block terminals 32 for cooperation with the sheet metal terminals 42. The cavities 62 are of rectangular outline, the long sides of adjacent cavities being spaced by walls 64 and the short sides being spaced by thicker walls 66.

The depending base portion is provided with a flat upper surface 68 which continues on to an upstanding support portion 70. The upstanding support portion 70 includes a horizontal floor 72 which provides a continuation of the surface 68. A pair of spaced, depending flanges 74 extend from end to end of the floor on the underside thereof.

The upstanding support portion 70 includes an upright block 76 which is rectangular in front elevation and from the end. Block 76 includes a flat front wall 78 and a recess 80 to the right thereof. The recess is cylindrical and comprises somewhat more than a semicylinder, having an arcuate forwardly projecting extension 82 and a flat end wall 84. A cylindrical recess 80 is provided with a substantially semi-circular floor 86 on which one of the zener diodes 44 rests, the floor being centrally relieved at 88 to accommodate the lead 46 on the under end of the respective zener diode 44. As will be seen, the center line 90 of the cylindrical recess 80 is offset forwardly from the center line 92 of the base or male portion 56. There is a rear wall 94 behind the recess 80 which is set back or relieved at 96 to present a relatively thin section for molding while retaining the position of the wall 94 for engagement with a further housing portion to be discussed shortly hereinafter.

Offset to the left from the recess 80 there is a rearwardly facing cylindrical recess 98 extending over somewhat greater than a semi-cylinder. This cylinder receives the second zener diode 44, and is provided with a semi-circular floor 100 centrally relieved at 102 so that the floor may support the zener diode with the lead 46 projecting through the central relieved portion. The center line 104 of the cylindrical recess 98 is spaced rearwardly from the center line or plane 92 previously referred to. The block 76 is completed by a flat left side wall 106 as may be seen.

The housing 36 further includes a female or cap portion 108 seen in detail in FIGS. 8-12. The cap portion 108 includes an upstanding cover 110 of rectangular configuration from all aspects and adapted to overlie and embrace the upstanding support portion 70. The cover includes vertical front and rear walls 112 of nearly square configuration, a right end wall 114 of the same height as the front and rear walls but of lesser width, and a left end wall 116 generally similar to the right end wall, but having a lower margin raised relative to the lower margin of the right end wall as will be apparent shortly hereinafter. The cover 110 further has a horizontal top wall 118 with a slot 120 therein providing clearance for the tines 52. The cover 110 is open at the bottom thereof.

The female or cap portion 108 further includes a plateau portion 122 lying to the left of the cover 110 and of lesser height. The plateau portion includes a top wall 124 joining the lower edge of the wall 116 at right angles thereto. A peripheral wall surrounds the plateau portion on three sides, including front and rear walls 126 respectively coplanar with the front and rear walls 112, and an end wall 128. The plateau is open at the bottom, and four downwardly directed cavities 130 are respectively aligned with the cavities 60 for receiving upper portions of the terminals 42. A median wall 132 and a transverse wall 134 separate the cavities, while a partition wall 136 lies between the cover portion 110 and plateau portion 122. The partition wall 136 is spaced from the front and rear walls 126 and depends from the wall 116 and the top wall 124. Four slots 138 extend through the top wall 124 in respective alignment with the cavities 130 to accommodate the top portions of the terminals 42. The bottom edges of all of the vertical walls of the female or cap portion 108 lie in a common plane, and each edge has a depending right angle bead or energy director 140 designed to abut the upper surface 68 of the base or male portion 56 to concentrate energy in a sonic welding operation to join the female or cap portion 108 to the base or male portion 56.

The terminals 42 all are identical and are shown in some detail in FIGS. 13-15, one thereof being shown in full detail in FIGS. 16-18. The terminals preferably are formed of phosphor-bronze and are solder tinned. Each terminal 42 comprises an integral sheet metal stamping and includes a flat intermediate body portion 142 having a single narrow leg 144 extending therefrom in coplanar relation and having an outwardly deflected tip 146. Lying on either side of the leg 144 are two offsets 148, each having a leg 150 thereon disposed parallel to but spaced from the plane of the leg 144. Each of the legs 150 then has an inwardly directed portion 152 leading to a reversely curved or re-entrant portion 154 having an outwardly deflected tip 156. Thus, one of the box terminals 32 readily enters into the space between the outwardly deflected tips 146 and 156 ultimately to lie between the leg 144 and the reversely curved or re-entrant portion 154 of the two legs 150.

At the opposite or upper edge of the flat body section 142 there is an offset strip 158 lying adjacent one margin of the flat section 142. A wire mounting section 160 is coplanar with the legs 150 and extends from the end of the offset section 158. A wire mounting ear 162 extends from one side of the wire mounting section and lies at right angles thereto.

The wire mounting ear 162 is of pentagonal outline, having a connecting edge 164 and an elongated rear edge 166 extending at right angles thereto. An outer edge 168 is parallel to the edge 164 in spaced relation thereto, being at right angles to the rear edge 166.

A wire engaging or gripping edge 170 extends from the attachment edge 164 and forms an angle of approximately 100 degrees therewith i.e., an angle of 10 degrees with a transverse plane normal to the wire attached section 160. The edge 170 is spaced from the offset section 158 in converging relation therewith, and extends substantially to the plane of the flat body section 142, being joined to the outer edge 168 by converging edge 172. One of the zener diode leads 46 is gripped between the offset section 158 and the converging edge 170 of the ear 162, lying against the wire mounting section 160 as shown in FIG. 16. The angular edge 172 and the opposite round corner 174 joining the offset section 158 and the flat section 142 aid in snapping the terminal wire 46 into position.

A full width offset section 176 leads from the far edge of the wire mounting section 160 back toward, but not completely to the plane of the flat section 142, there being a connecting section 178 extending from the upper end of the offset section 176 to a blade terminal 180 having a rounded upper end 182. The blade terminal 180 is straight, but is curved in a shallow curve 186 about its longitudinal center line 184. This curvature provides for a tight, resilient engagement with bridging clips, etc. secured to the upper end of the terminal.

It will be understood that the terminal 42 as just disclosed is efficient in the use of stock material. All of the various parts are struck from within a rectangular outline. Even the right angularly disposed wire mounting ear 162 is struck from the area that becomes the blank space to the side of the wire mounting section 160.

The grounding terminal 50 is shown generally in FIGS. 1, 15, and 16, and more specifically in FIGS. 19–21. In the latter, the grounding terminal 50 will be seen to have a generally rectangular base 188 having two rectangular holes 190 punched therein on opposite sides of the center line 192 and longitudinally offset. Four shear tabs 194 arranged in respective pairs about the holes 190 are partially struck upwardly from the surface of the base 188 to provide confronting right angle or sharp edges 196 spaced in pairs on opposite sides of the holes 190 and raised from the base 188.

The grounding terminal 50 further is provided with an upstanding flange 198 spaced slightly in from one edge of the base at 188 (the base is rectangular) leaving an edge opening notch 200 adjacent one corner of the base. The tines 52 are formed integrally with this flange and are separated by a notch 202 having elongated straight edges 204 to engage the common ground wire 54. As will be apparent, the base 188 and most of the flange 198 are disposed beneath the top wall 118 of the cap portion 108 with only the tines 52 and a minor portion of the flange 198 extending above the top wall.

All of the parts of the present transient voltage protector have now been described. Interfitting of the parts is highly efficient. The bottom ends of the terminals 42 rest on the bottom wall of the base or male portion 56, being slightly larger than the apertures 62 in the bottom wall. The upward position of the terminals is determined in part by gravity and is limited by the fact that the offsets 176 abut the underside of the top wall 124 of the plateau portion of the cap portion. From the foregoing the mid portions of the terminals are positioned just above the depending base portion 58 with the offset portion 158 lying just into the plateau portion so that the terminals 46 may readily lie on top of the offset portions 158 of the two adjacent terminals and against the wire mounting section 180, being held tightly by the wire mounting ears 162.

At the same time the two zener diodes 44 are supported by the circular bottom wall or floor portions 86 and 100 with the diode terminals 46 extending through the relieved arcuate portions 88 and 102 thereof. These terminals tend to limit the upward position of the diodes, and a positive upward limitation is applied by the leads 48 abutting the underside of the top wall of the cover 110 of the female or cap portion 108. The grounding terminal 50 is positioned by bottoming on the tops of the zener diodes 44 with the spaced tines 52 extending upwardly and out of the housing, similar to the upper ends of the terminals 42.

The raising and offsetting of the portion of the housing carrying the zener diodes provides clearance adjacent the 66-M block, as is necessary due to the small size of the latter.

The specific example of the invention as herein shown and described is for illustrative purposes only. Various changes in structure will no doubt occur to those skilled in the art and will be understood as forming a part of the present invention insofar as they fall within the spirit and scope of the appended claims.

The invention is claimed as follows:

1. A transient voltage protector for telephone circuits and the like comprising an insulating plastic housing having a lower portion and an upper portion, at least one terminal in said lower portion and each of said at least one terminal having a female connector thereon disposed within said housing, said housing having an aperture therein respectfully aligned with each of said female connectors for admitting a male terminal such as on a telephone connector, voltage limiting means in said upper housing portion, means connecting said voltage limiting means to one of said at least one terminal, a grounding terminal in said upper housing portion, means connecting said voltage limiting means to said grounding terminal, an opening in said upper housing portion adjacent said grounding terminal, and a connector on said grounding terminal extending through said opening and out of said housing.

2. A transient voltage protector as set forth in claim 1 wherein the grounding terminal connector comprises a pair of spaced tines adapted to receive a ground wire between them.

3. A transient voltage protector as set forth in claim 1 wherein said voltage limiting means has a wire terminal, wherein said grounding terminal has a hole and adjacent shear tabs receiving said wire terminal.

4. A transient voltage protector as set forth in claim 2 wherein said voltage limiting means has a wire terminal, wherein said grounding terminal has a hole and adjacent shear tabs receiving said wire terminal.

5. A transient voltage protector as set forth in claim 1 wherein a voltage limiting means comprises two voltage limiting devices each having a wire terminal, and wherein said grounding terminal has two holes and adjacent shear tabs respectively receiving said wire terminals.

6. A transient voltage protector as set forth in claim 5 wherein said grounding terminal connector comprises a pair of spaced tines adapted to receive a ground wire between them.

7. A transient voltage protector as set forth in claim 1 wherein said voltage limiting means has at least one terminal wire extending therefrom, and wherein each of said at least one terminal has an intermediate position, a pair of angularly disposed surfaces and a tab adapted to grip such a terminal wire and at least one of said at least one terminal gripping said terminal wire between said tab and said angularly disposed surfaces.

8. A transient voltage protector as set forth in claim 7 wherein said angularly disposed surfaces are substantially at right angles to one another, said tab lying at right angles to said surfaces and having a wire engaging edge at an acute angle and adjacent one of said surfaces and forming a pocket with said surfaces.

9. A transient voltage protector as set forth in claim 1 wherein said voltage limiting means has a cylindrical shape and wherein said upper housing portion has a cavity shaped as at a least a part of a cylinder for receiving said cylindrical voltage limiting means.

10. A transient voltage protector as set forth in claim 9 wherein said voltage limiting means comprises a pair of voltage limiting devices and wherein said upper housing portion has two edge opening cavities which face in opposite directions and each shaped as at least a portion of a cylinder for respectively receiving said pair of voltage limiting devices.

* * * * *